US007920639B2

(12) United States Patent
Ishii et al.

(10) Patent No.: US 7,920,639 B2
(45) Date of Patent: Apr. 5, 2011

(54) RECEPTION DEVICE, COMMUNICATION CONTROL METHOD IN MOBILE COMMUNICATION SYSTEM

(75) Inventors: Hiroyuki Ishii, Yokosuka (JP); Takuya Sato, Yokohama (JP); Hidehiro Ando, Yokohama (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 1045 days.

(21) Appl. No.: 11/489,517

(22) Filed: Jul. 20, 2006

(65) Prior Publication Data
US 2007/0036204 A1 Feb. 15, 2007

(30) Foreign Application Priority Data
Aug. 9, 2005 (JP) ................................. 2005-230973

(51) Int. Cl.
H04B 7/02 (2006.01)
H04L 1/02 (2006.01)
(52) U.S. Cl. .......................................... 375/267; 455/69
(58) Field of Classification Search .................. 375/144, 375/147, 148, 260, 267, 347, 349; 370/333, 370/334, 335, 342; 455/515, 517, 69
See application file for complete search history.

(56) References Cited

U.S. PATENT DOCUMENTS

| 6,763,011 | B1  |   | 7/2004  | Haekkinen et al. |         |
|-----------|-----|---|---------|------------------|---------|
| 6,879,831 | B2  | * | 4/2005  | Hamabe           | 455/442 |
| 6,922,560 | B1  | * | 7/2005  | Zhang            | 455/423 |
| 2002/0003833 | A1 | * | 1/2002 | Usuda et al.     | 375/144 |
| 2003/0148770 | A1 | * | 8/2003 | Das et al.       | 455/455 |
| 2005/0026566 | A1 | * | 2/2005 | Dabak et al.     | 455/67.11 |
| 2005/0047529 | A1 | * | 3/2005 | Luo              | 375/341 |
| 2005/0152263 | A1 | * | 7/2005 | Speth            | 370/203 |
| 2005/0286618 | A1 | * | 12/2005 | Abe             | 375/219 |
| 2006/0068791 | A1 | * | 3/2006 | Lindoff          | 455/442 |
| 2006/0176858 | A1 |   | 8/2006  | Ishii et al.     |         |
| 2006/0209883 | A1 | * | 9/2006  | Suzuki           | 370/465 |

FOREIGN PATENT DOCUMENTS

| EP | 1 681 784 A2    | 7/2006  |
|----|-----------------|---------|
| JP | 2003-298762 A   | 10/2003 |
| JP | 2004-179931 A   | 6/2004  |
| JP | 2004-208200 A   | 7/2004  |
| JP | 2005-348182 A   | 12/2005 |
| WO | WO 01/28128 A1  | 4/2001  |

OTHER PUBLICATIONS

3GPP TS 25.214 V5.8.0, Mar. 2004, pp. 1-64.
Universal Mobile Telecommunications System (UMTS); Physical layer procedures (FDD) (3GPP TS 25.214 version 6.5.0 Release Mar. 6, 2005, pp. 1-70.
Mamoru Sawahashi et al., "Enhanced Wireless Access Technologies and Experiments for W-CDMA Communications", IEEE Personal Communications, vol. 7, No. 6, Dec. 2000, pp. 6-16.
European Search Report dated Oct. 27, 2006 (five (5) pages).

* cited by examiner

Primary Examiner — Young T. Tse
(74) Attorney, Agent, or Firm — Crowell & Moring LLP (57) ABSTRACT

When a closed loop transmission diversity control is performed by controlling the phase of the transmission signals from the plurality of antennas according to feedback information noticed by the mobile station to transmit the signals, an antenna verification on-off control unit 370 controls the on-off of an antenna verification process of estimating the phase of the transmission signals from the plurality of antennas according to the information about the channel of the signals transmitted in the uplink from the mobile station to a radio base station. Thus, depending on the channel type (for example, a packet channel, a voice channel, etc.), the on-off control is performed on the antenna verification process, thereby performing easier and more appropriate control and improving the quality of a channel.

6 Claims, 8 Drawing Sheets

RECEPTION DEVICE, COMMUNICATION CONTROL METHOD IN MOBILE COMMUNICATION SYSTEM

BACKGROUND OF THE INVENTION

1. Field of the Invention

The present invention relates to a reception device and a communication control method in a mobile communication system, and more specifically to a reception device used as a downlink mobile station which effects transmission diversity control in the mobile communication system and a communication control method for use with a mobile communication system including the reception device.

2. Description of the Related Art

Generally, "fading" occurs in wireless communication, and the fading considerably degrades the transmission quality, that is, a bit error rate characteristic.

A method for compensating for the degradation of the transmission quality due to the fading can be a commonly known "transmission diversity" (for example, "3GPP TR25.214 v5.8.0", March 2004; hereinafter referred to as non-patent document 1). Described below is the "closed loop transmission diversity mode 1" as a type of transmission diversity.

Figure 10:
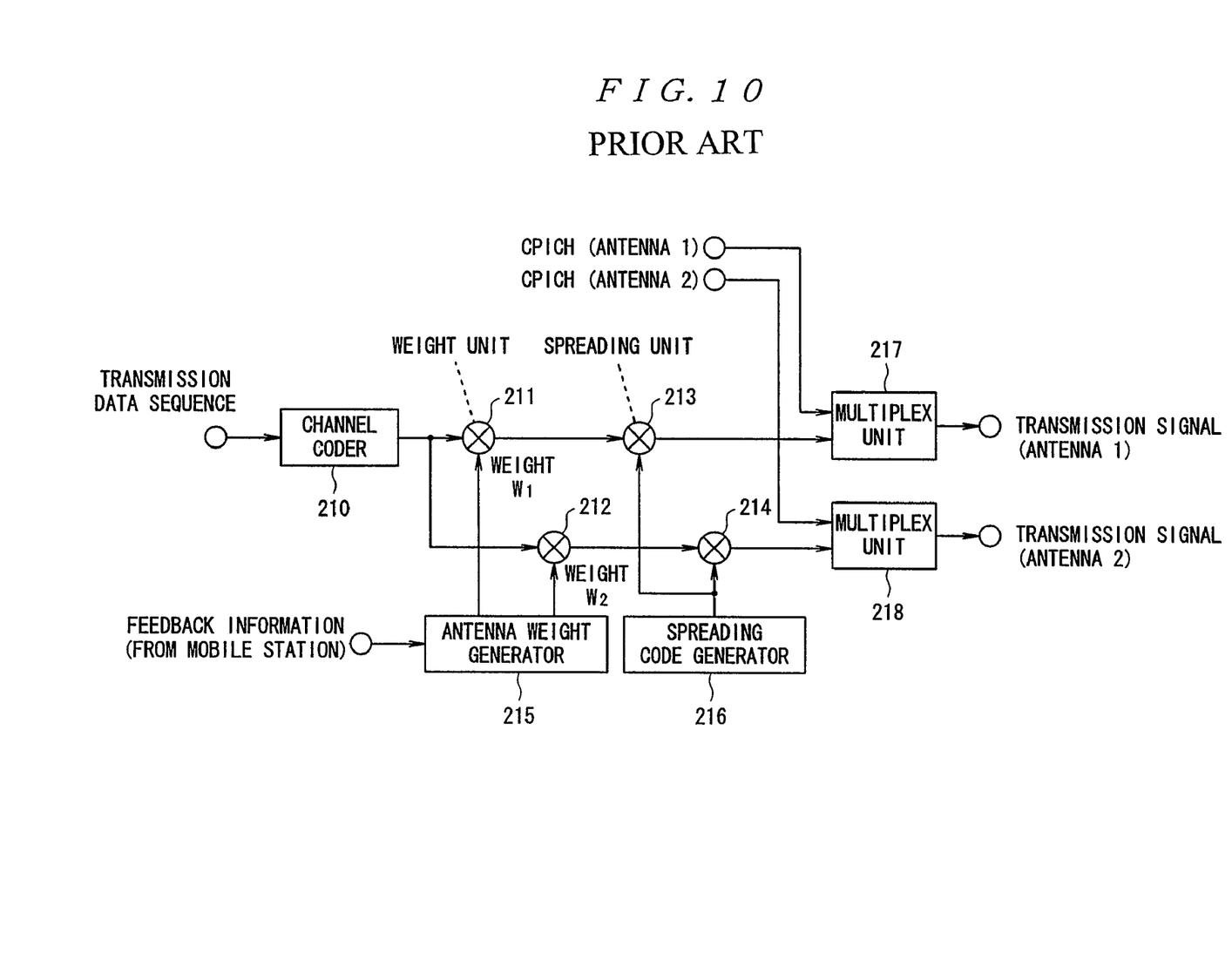
FIG. 10 shows an example of the configuration of the transmission unit in a common closed loop transmission diversity.
Figure 11:
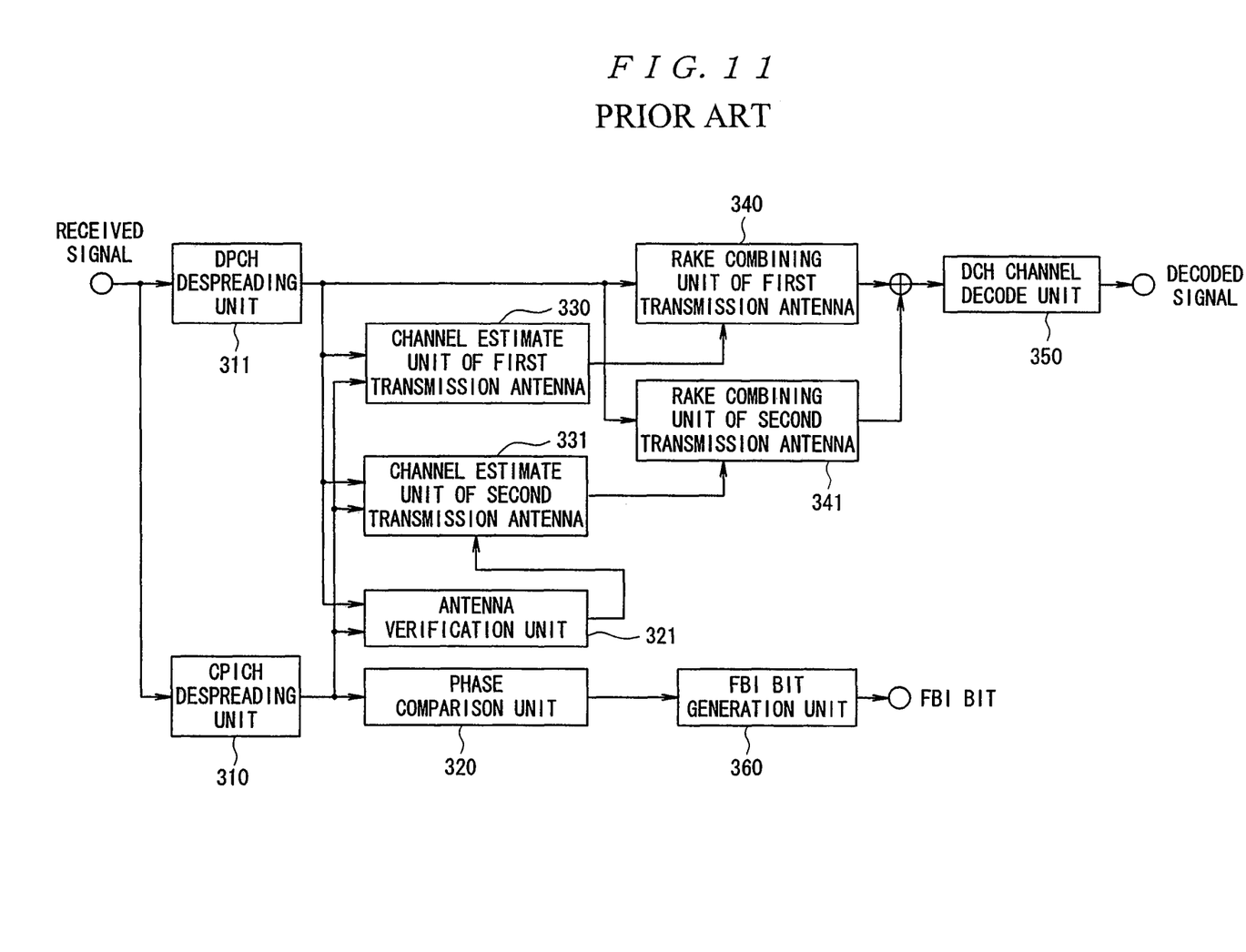
FIG. 11 shows an example of the configuration of the reception unit in a common closed loop transmission diversity.

FIG. 10 shows the configuration of the transmission unit for realizing closed loop transmission diversity, and FIG. 11 shows the configuration of its reception unit.

By referring to FIG. 10, the transmission unit includes: a channel coder 210 for inputting a transmission data sequence; weight units 211 and 212; an antenna weight generator 215 for assigning a weight to the weight units 211 and 212 according to feedback information from a mobile station; spreading units 213 and 214; a spreading code generator 216 for assigning a spreading code to the spreading units 213 and 214; and multiplex units 217 and 218 for transmitting transmission signals to an antenna provided corresponding to antennas 1 and 2.

By referring to FIG. 11, the reception unit includes: a CPICH despreading unit 310 for despreading a CPICH (common pilot channel) using a predetermined scrambling code and a channelization code of the CPICH in response to input received signals; a phase comparison unit 320 for determining a phase difference between signals from a first transmission antenna and signals from a second transmission antenna using received CPICH symbols; and an FBI bit generation unit 360 for receiving a determination result about a phase difference and generating an FBI (feedback information) bit.

The reception unit is also constituted by including: a DPCH despreading unit 311 for despreading a DPCH (dedicated physical channel) using a predetermined scrambling code and a channelization code of the DPCH on input received signals; an antenna verification unit 321 for estimating the phase of signals from two antennas using the CPICH symbols received from the CPICH despreading unit 310 and dedicated pilot symbols received from the DPCH despreading unit 311 (hereinafter referred to as antenna verification); a channel estimate unit 330 of a first transmission antenna for obtaining channel estimated values of signals from the first transmission antenna using the CPICH symbols; and a channel estimate unit 331 of a second transmission antenna for obtaining a channel estimated values of signals from the second transmission antenna using the CPICH symbols.

Furthermore, the reception unit is constituted by including: an RAKE combining unit 340 of the first transmission antenna for performing RAKE combining on DPCH symbols from the first transmission antenna; an RAKE combining unit 341 of the second transmission antenna for performing RAKE combining on DPCH symbols from the second transmission antenna; and a DCH (data channel) channel decode unit 350 for combining the DPCH symbols from the first transmission antenna with the DPCH symbols from the second transmission antenna, and then decoding a channel.

In the closed loop transmission diversity realized by the above-mentioned transmission unit and reception unit, two transmission data sequences are respectively multiplied by $W_1 = A_1 e^{i\phi 1}$ and $W_2 = A_2 e^{i\phi 2}$ based on the feedback information (FBI) bit from the mobile station, and then spreading is performed, and the data sequences are transmitted.

First, a CPICH as a common pilot channel is transmitted from the two antennas with the same carrier phase. The CPICHs transmitted from the two antennas are spread using the same spreading code and pilot symbols are changed, thereby realizing orthogonalization. The reception device generates an FBI bit for control of a reception carrier phase difference depending on the reception carrier phase difference of the signals demultiplexed after the despreading of the CPICHs from the two antennas such that the signal sequences transmitted from the two antennas can be in phase at the reception terminal of the mobile station, and transmits it over the DPCCH of the dedicated physical channel DPCH in the uplink from the mobile station to the radio base station. Thus, by controlling the transmission carrier phase of the antenna 2 using the FBI bit from the mobile station, a bit error caused by a drop of the received signal power due to the fading can be reduced. The transmission unit of the base station multiplies the transmission data sequences of the two antennas by the transmission antenna weights $W_1$ and $W_2$ generated based on the FBI bit from the mobile station, and transmits the transmission data sequences multiplied by the transmission antenna weights from each antenna.

In the closed loop transmission diversity mode 1 specified in the 3GPP (3rd Generation Partnership Project), the transmission carrier phase of the dedicated physical channel DPCH of the second antenna is controlled with the resolution of the carrier phase of $\pi/4$ such that the received signals from the two antennas can be substantially in phase when received by the mobile station. Described below in more detail is the operation performed when the closed loop transmission diversity mode 1 is applied to the dedicated physical channel DPCH.

The transmission amplitudes of the two antennas in the slot n are $A_{1,n} = A_{2,n} = 1/\sqrt{2}$, and the transmission carrier phases are $\phi_{1,n} = 0$, $\phi_{2,n} = \{\pi/4, \pm 3\pi/4\}$.

The mobile station estimates the reception carrier phases $\theta^{CP}_{1,n}$ and $\theta^{CP}_{2,n}$ of the CPICHs transmitted from the two antennas, and generates an FBI bit $b_n$ at the slot n.

That is, at the even slot n,
if $-\pi/2 \leq (\theta^{CP}_{1,n}, \theta^{CP}_{2,n}) \leq \pi/2$ then $b_n = 0$,
otherwise $b_n = 1$
At the odd slot n,
if $0 \leq (\theta^{CP}_{1,n}, \theta^{CP}_{2,n}) \leq \pi$ then $b_n = 0$,
otherwise $b_n = 1$ The base station determines the provisional transmission carrier phase $\psi_{2,(n+1)}$ at the (n+1) slot of the DPCH at the second antenna as follows depending on the decode result $b_n'$ (when there is no FBI bit error, $b_n' = b_n$) of the FBI bit. When n is even,
if $b_n' = 0$ then $\psi_{2,(n+1)} = 0$,
otherwise $\psi_{2,(n+1)} = 0$
When n is odd,
if $b_n' = 0$ then $\psi_{2,(n+1)} = \pi/2$,
otherwise $\psi_{2,(n+1)} = -\pi/2$ The transmission carrier phase $\psi_{2,(n+1)}$ of the second antenna at the slot (n+1) is finally obtained by the following equation from the provisional carrier phases of the slots n and (n+1).

$$\phi_{2,(n+1)} = (\psi_{2,n} + \psi_{2,(n+1)})/2$$

There can be the case where an error occurs in an FBI bit in the uplink. In this case, since the base station performs transmission with a carrier phase different from that of the control command from the mobile station, an appropriate phase control cannot be performed, thereby increasing an error rate. To solve this problem, the mobile station performs the antenna verification process of estimating a transmission weight (transmission carrier phase) at each slot of the DPCH. An example of the antenna verification is described in, for example, the non-patent document 1, annex A.1, Antenna Verification.

Briefly described below is an example of an antenna verification process. By the following equation, the antenna verification process of the transmission carrier phase of the second antenna is performed. That is, when n is even,
if $2\Sigma(1/\sigma_1^2)\{\sqrt{2}\cdot\text{Re}(\gamma\xi^D_{2,n,l}\xi^{CP*}_{2,n,l})$
$> \ln\{P(\psi_{2,n}=\sigma)/P(\psi_{2,n}=0)\}$,
then $\{\psi_{1,n}', \psi_{2,n}'\} = \{0, 0\}$
otherwise $\{\psi_{1,n}', \psi_{2,n}'\} = \{0, \sigma\}$ When n is odd,
if $-2\Sigma(1/\sigma_1^2)\{\sqrt{2}\cdot\text{Im}(\gamma\xi^D_{2,n,l}\xi^{CP*}_{2,n,l})$
$> \ln\{P(\psi_{2,n}=\sigma/2)/P(\psi_{2,n}=-\pi/2)\}$,
then $\{\psi_{1,n}', \psi_{2,n}'\} = \{0, -\pi/2\}$
otherwise $\{\psi_{1,n}', \psi_{2,n}'\} = \{0, \sigma/2\}$ where $\Sigma$ indicates a sum of l=1 to L, l is an index of path. $\tau^D_{i,n,l}'$ and $\xi^{CP*}_{i,n,l}'$ are momentary channel estimated values of the DPCH and CPICH of the 1-th path of the n-th slot in the transmission antenna i, respectively, and $\gamma$ indicates the ratio of the SIR (Signal to Interference Ratio) of the DPCH to the SIR of the CPICH, $\sigma_1^2$ indicates the thermal noise and interference power of each path, and P(•) indicates a presumed probability. For example, when it is estimated that the error rate of the FBI bit in the uplink is 4%, and if an FBI bit corresponding to $\psi_{2,n}$ is transmitted, then $P(\psi_{2,n}=0)=96\%$.

When the antenna verification process is to be performed, $\phi_{2,(n+1)}$ of the transmission carrier phase of the second antenna of the slot (n+1) is expressed by the following equation.

$$\phi_{2,(n+1)} = (\psi_{2,n}' + \psi_{2,(n+1)}')/2$$

When the antenna verification process is not performed, a mobile station assumes that there is no error in the FBI bit transmitted by the station in the uplink, and performs reception in the downlink.

Generally, when there is an error in an FBI bit in the uplink, the characteristic of the downlink is improved when the above-mentioned antenna verification process is performed.

However, since the antenna verification process is the function of correcting an error in phase control when an FBI bit is erroneous in the uplink, there is a possibility that it is determined there is an error in phase control when there is no error in the FBI bit in the uplink and the transmission in the downlink is performed with an appropriate phase. In this case, although the transmission is performed with an appropriate phase, the receiver receives data with wrong determination information about the phase, thereby increasing the error rate. Therefore, when an FBI bit error rate is low, a higher characteristic can be obtained if the antenna verification process is not performed at all, and the antenna verification process is recommended when the FBI bit error rate is high.

The FBI bit error rate varies depending on the transmission rate of the channel in the uplink, a spreading ratio, a transmission time interval (transmission time interval: hereinafter referred to as a TTI for short), the number of FBI bits, a target error rate, and a slot format. Normally, when the transmission rate is high, the FBI bit error rate is low. When the transmission rate is low, the FBI bit error rate is high.

An FBI bit is mapped over the dedicated physical control channel DPCCH, not over the dedicated physical data channel DPDCH. Therefore, when a comparison is made between a low amplitude ratio of the DPCCH to the DPDCH and a high amplitude ratio thereof, the FBI bit error rate is lower when the amplitude ratio is high. The dedicated physical data channel DPDCH indicates a data channel in a physical layer, and the dedicated physical control channel DPCCH indicates a control channel in a physical layer.

Generally, when a mobile station performs the antenna verification process, the antenna verification process is performed on all channels. When the antenna verification process is not performed, the antenna verification process is not performed on any channel.

There is a technology of stopping the antenna verification process when the status of the transmission line is good (for example, JP2004-179931A; hereinafter referred to as patent document 1).

SUMMARY OF THE INVENTION

As described above, when a mobile station communicates with a radio base station using the transmission diversity in a downlink, it is determined whether or not antenna verification is performed regardless of the channel type. Therefore, there can be the possibility that the antenna verification is performed when it is not necessary to perform the antenna verification, or it is not performed when necessary, thereby increasing the channel error rate. In addition, when transmission power control is performed, the transmission power to be assigned to the channel is increased.

In the patent document 1, the on-off control of the antenna verification process is performed depending on the up/down signals in the transmission power control and the value of the transmission power. Therefore, it is considered that appropriate control cannot be performed based on the channel type.

The present invention has been developed to solve the above-mentioned problems with the conventional technology, and an object of the present invention is to provide a reception device and a mobile communication system capable of performing control by switching on-off of an antenna verification process on each channel such that, for example, antenna verification is not performed when a channel has a low FBI error rate in an uplink and is performed when a channel has a high FBI error rate, thereby improving the quality of the channel.

The reception device according to an embodiment of the present invention for use in a mobile communication system has a mobile station and a radio base station to which transmission diversity for performing transmission using a plurality of antennas is applied in a downlink to the mobile station, and includes antenna verification on-off control means for controlling on-off of an antenna verification process of estimating a phase of transmission signals from the plurality of antennas according to information about a channel of signals transmitted in an uplink from the mobile station to the radio base station when a closed loop transmission diversity control is performed by controlling the phase of the transmission signals from the plurality of antennas according to feedback information noticed by the mobile station to transmit the signals. With the configuration, control can be performed by switching the on-off of the antenna verification process on each channel, thereby improving the quality of the channel.

In an embodiment of the present invention, the information about the channel is a channel type, and the antenna verification on-off control means performs control such that the antenna verification process is performed when the channel type is a channel for transmission of voice. With the configuration, the on-off control is performed in the antenna verification process depending on the channel type (for example, a packet channel, an voice channel, etc.). Therefore, easier and more appropriate control can be performed.

In an embodiment of the present invention, the information about the channel is a transmission rate of a channel, an amplitude ratio of a control channel to a data channel, a transmission time interval, a target error rate, and a slot format based on at least one of which the antenna verification on-off control means controls on-off of the antenna verification process. With the configuration, the antenna verification process is performed depending on the transmission rate of a channel, the amplitude ratio of a control channel to a data channel, the transmission time interval, the target error rate, and the slot format. Therefore, easier and more appropriate control can be performed.

In an embodiment of the present invention, the antenna verification on-off control means performs control such that the antenna verification process can be performed when the transmission rate of the channel is equal to or less than a predetermined value. With the configuration, on-off of the antenna verification process can be appropriately controlled depending on the transmission rate of a channel.

In an embodiment of the present invention, the antenna verification on-off control means performs control such that the antenna verification process can be performed when the amplitude ratio is less than a predetermined value.

In an embodiment of the present invention, the invention further includes a presumed probability control unit for setting a presumed probability for use in the antenna verification process according to the information about the channel. With the configuration, the presumed probability for use in the antenna verification process can be appropriately set for each channel.

In an embodiment of the present invention, the information about the channel is a channel type, and the presumed probability control unit sets a low presumed probability when the channel type is a channel for transmission of voice signals, and sets a high presumed probability when the channel type is a channel for transmission of packet signals. With the configuration, the presumed probability for use in the antenna verification process can be appropriate set depending on the channel type (for example, a packet channel, a voice channel, etc.)

In an embodiment of the present invention, the information about the channel is a transmission rate of a channel, an amplitude ratio of a control channel to a data channel, a transmission time interval, a target error rate, and a slot format based on at least one of which the presumed probability control unit sets the presumed probability. With the configuration, the presumed probability for use in the antenna verification process can be appropriately set depending on the transmission rate of a channel, the amplitude ratio of a control channel to a data channel, the transmission time interval, the target error rate, and the slot format. With this configuration, the presumed probability for use in the antenna verification process can be appropriately set depending on the transmission rate of a channel, the amplitude ratio of a control channel to a data channel, the transmission time interval, the target error rate, and the slot format.

In an embodiment of the present invention, the presumed probability control unit sets a low presumed probability when the transmission rate of the channel is low, and sets a high presumed probability when the transmission rate of the channel is high. With this configuration, the presumed probability for use in the antenna verification process can be appropriately set depending on the transmission rate of a channel.

In an embodiment of the present invention, the communication control method of the present invention is used with a mobile communication system having a mobile station and a radio base station to which transmission diversity for performing transmission using a plurality of antennas is applied in a downlink to the mobile station, and controls on-off of an antenna verification process of estimating a phase of transmission signals from the plurality of antennas according to information about a channel of signals transmitted in an uplink from the mobile station to the radio base station when a closed loop transmission diversity control is performed by controlling the phase of the transmission signals from the plurality of antennas according to feedback information noticed by the mobile station to transmit the signals. In this process, control is performed by switching the on-off of the antenna verification process on each channel, and the quality of the channel can be improved.

As described above, the present invention can improve the quality of a downlink, for example, the BLER (block error rate) and required transmission power, by controlling whether or not a result of the antenna verification is to be considered for each channel type.

DETAILED DESCRIPTION OF THE PREFERRED EMBODIMENTS

The mode for embodying the present invention is explained below by referring to the attached drawings. In the following explanation, an equivalent reference numeral in other drawings is indicated using the same reference numeral.

(Configuration of the Reception Device)

Figure 1:
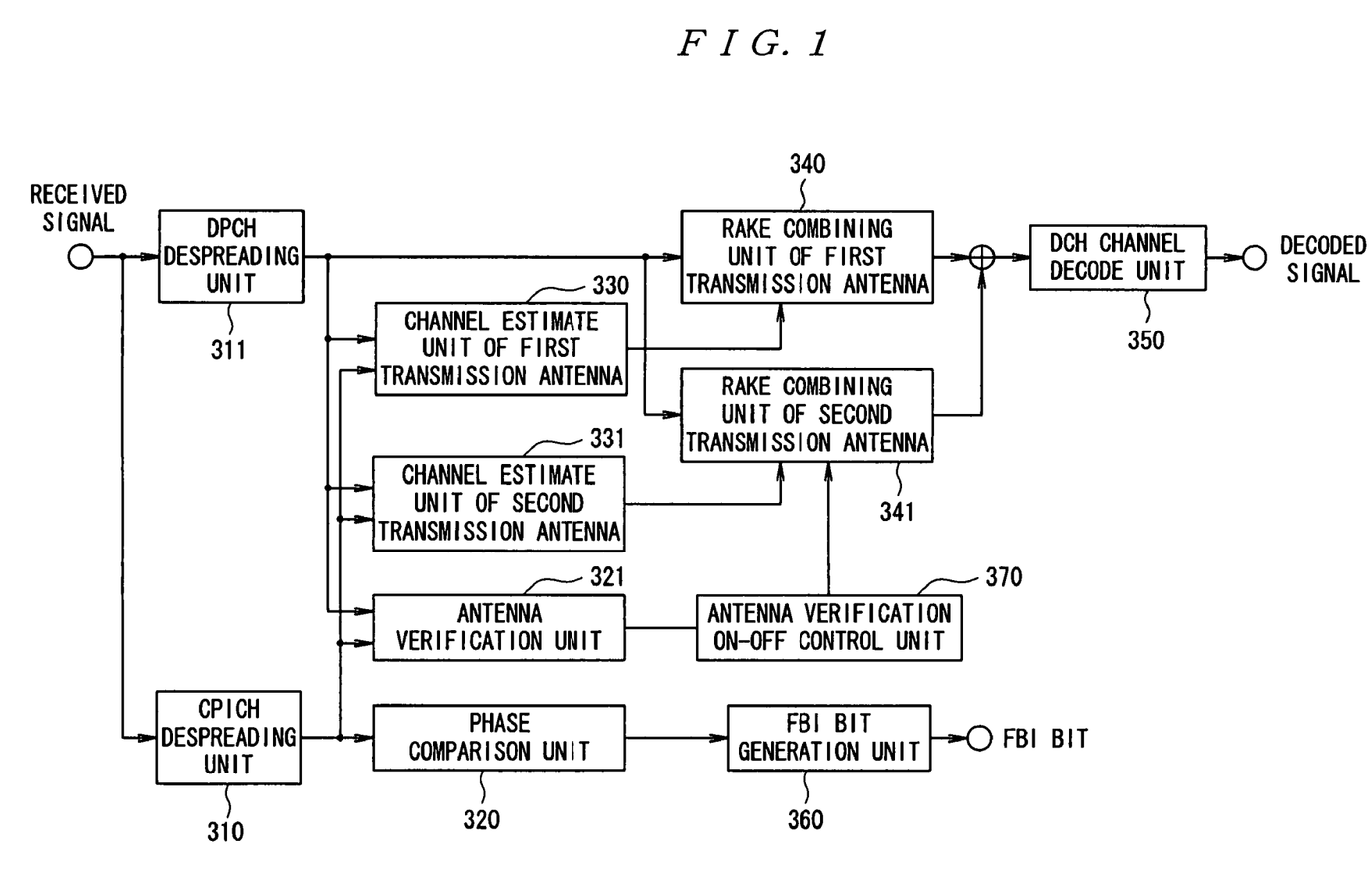
FIG. 1 is a block diagram showing an example of the configuration of the reception device according to a mode for embodying the present invention.

FIG. 1 is a block diagram showing an example of the configuration of the reception device according to a mode for embodying the present invention. In FIG. 1, the device is different in configuration from the reception device shown in FIG. 11 in that an antenna verification on-off control unit 370 for control of the execution or stop of the antenna verification process is added.

With the configuration, the CPICH despreading unit 310 despreads the CPICH on input received signals using a predetermined scrambling code and a channelization code of a CPICH, and outputs resultant CPICH symbols from the despreading to the phase comparison unit 320, the antenna verification unit 321, the channel estimate unit 330 of the first transmission antenna and the channel estimate unit 331 of the second transmission antenna. The received signals refers to signals amplified by a low-noise amplifier, frequency converted, linearly amplified by an automatic gain control amplifier, orthogonalization detected, A/D converted, band limited by a root Nyquist filter after being received by an antenna.

Upon receipt of the received signals, the DPCH despreading unit 311 despreads the DPCH using a predetermined scrambling code and a channelization code of the DPCH, and outputs the despread DPCH symbols to the RAKE combining unit 340 of the first transmission antenna for the DPCH and the RAKE combining unit 341 of the second transmission antenna for the DPCH. The DPCH despreading unit 311 outputs dedicated pilot symbols in the DPCH symbols to the antenna verification unit 321. The DPCH despreading unit 311 can also output the dedicated pilot symbols to the first transmission antenna channel estimate unit 330 and the second transmission antenna channel estimate unit 331.

The phase comparison unit 320 determines the phase difference between the signals from the first transmission antenna and the signals from the second transmission antenna using the CPICH symbols received from the CPICH despreading unit 310, and outputs the determination result to the FBI bit generation unit 360.

The antenna verification unit 321 performs antenna verification using the CPICH symbols received from the CPICH despreading unit 310, and the dedicated pilot symbols received from the DPCH despreading unit 311, estimates a weight coefficient by which the signals from the second transmission antenna are multiplied, and outputs the estimation result of the weight coefficient, that is, a result of the antenna verification to the antenna verification on-off control unit 370.

The channel estimate unit 330 of the first transmission antenna obtains channel estimated values of the signals from the first transmission antenna using the CPICH symbols received from the CPICH despreading unit 310, and outputs the channel estimated values of the first antenna to the RAKE combining unit 340 of the first transmission antenna for the DPCH. The channel estimated values of the signals from the first transmission antenna can also be calculated not only using the CPICH symbols, but also using the dedicated pilot symbols received from the DPCH despreading unit 311.

The channel estimate unit 331 of the second transmission antenna obtains channel estimated values of the signals from the second antenna using the CPICH symbols received from the CPICH despreading unit 310, and outputs the channel estimated values of the second transmission antenna to the RAKE combining unit 341 of the second transmission antenna for the DPCH. The channel estimated values of the signals from the second transmission antenna can also be calculated not only using the CPICH symbols, but also using the dedicated pilot symbols received from the DPCH despreading unit 311.

The RAKE combining unit 340 of the first antenna for the DPCH receives from the DPCH despreading unit 311 the DPCH symbols from the first transmission antenna, and receives from the channel estimate unit 330 of the first transmission antenna the channel estimated values of the signals from the first transmission antenna, performs RAKE combining on the DPCH symbols from the first transmission antenna, and transmits the signals after the RAKE combining to the channel decode unit for the DPCH.

The RAKE combining unit 341 of the second antenna for the DPCH receives from the DPCH despreading unit 311 the DPCH symbols from the second transmission antenna, receives from the channel estimate unit 331 of the second transmission antenna the channel estimated values of the signals from the second transmission antenna, and receives a result of antenna verification from the antenna verification on-off control unit 370, performs RAKE combining on the DPCH symbols from the second transmission antenna, and transmits the signals after the RAKE combining to the channel decode unit for the DPCH. When the RAKE combining is performed, the transmission antenna weight by which the transmission signals are multiplied are considered, and the result of the antenna verification is considered for the antenna weight. When the antenna verification on-off control unit 370 turns off the antenna verification process, a result of the antenna verification cannot be received. Therefore, the RAKE combining unit 341 of the second antenna for the DPCH performs RAKE combining with the antenna weight used when the antenna verification process is off.

The DCH channel decode unit 350 receives from the RAKE combining unit 340 of the first transmission antenna for the DPCH the DPCH symbols from the first transmission antenna after the RAKE combining, receives from the RAKE combining unit 341 of the second transmission antenna for the DPCH the DPCH symbols from the second transmission antenna after the RAKE combining, combines the DPCH symbols from the first transmission antenna with the DPCH symbols from the second transmission antenna, and then performs channel decoding. The channel decoding refers to, for example, convolutional decoding, turbo coding, etc., and depends on the channel coding method on the transmission side.

The FBI bit generation unit 360 receives from the phase comparison unit 320 a determination result about the phase difference between the signals from the first transmission antenna and the signals from the second transmission antenna, and generates an FBI bit.

The antenna verification on-off control unit 370 receives from the antenna verification unit 321 a result of antenna verification, determines on-off of the antenna verification process based on the information about a channel in an uplink, for example, a channel type, or based on at least one of the transmission rate of the channel type, the amplitude ratio of the control channel to the data channel, the TTI, the target error rate, and the slot format, and if it is determined that the antenna verification process is to be performed on the channel, the unit notifies the RAKE combining unit 341 of the second transmission antenna for the DPCH of a result of the antenna verification.

It can be determined that the antenna verification is on if, for example, the channel in an uplink transmits voice signals, and the antenna verification process is off if the channel type of the uplink refers to the transmission of packet signals.

It can also be determined that the antenna verification process is on when, for example, the transmission rate of the channel in the uplink is equal to or less than 32 kbps, and the antenna verification process is off when the transmission rate of the channel type in the uplink is not equal to or less than 32 kbps.

It can also be determined that the antenna verification process is on, for example, when the amplitude ratio of the DPCCH to the DPDCH in the uplink is lower than 12/15, and the antenna verification is off when the amplitude ratio of the DPCCH to the DPDCH in the uplink is equal to or higher than 12/15.

The on-off of the antenna verification process can be controlled based on both the transmission rate and the amplitude ratio of the DPCCH to the DPDCH in the uplink. For example, it can be determined that the antenna verification process is on when the transmission rate is equal to or lower than 32 kbps, and the amplitude ratio of the DPCCH to the DPDCH in the uplink is lower than 12/15, the antenna verification process is off when the transmission rate is equal to or lower than 32 kbps, and the amplitude ratio of the DPCCH to the DPDCH in the uplink is equal to or higher than 12/15, or the transmission rate is higher than 32 Kbps.

In the explanation above, the antenna verification on-off control unit 370 controls the on-off of the antenna verification process using the channel type in the uplink, transmission rate, etc. However, since a channel in an uplink is generally symmetrical about a channel in a downlink, the on-off of the antenna verification process can be controlled using the channel type in a downlink, the transmission rate, etc. in place of the channel type in an uplink.

(Communication Control Method of Mobile Communication System)

Next, the communication control method of the mobile communication system according to the present invention is explained below by referring to the flowcharts shown in FIGS. 2 to 5.

(Communication Control Method Depending on Whether or not Voice Signals are Transmitted)

Figure 2:
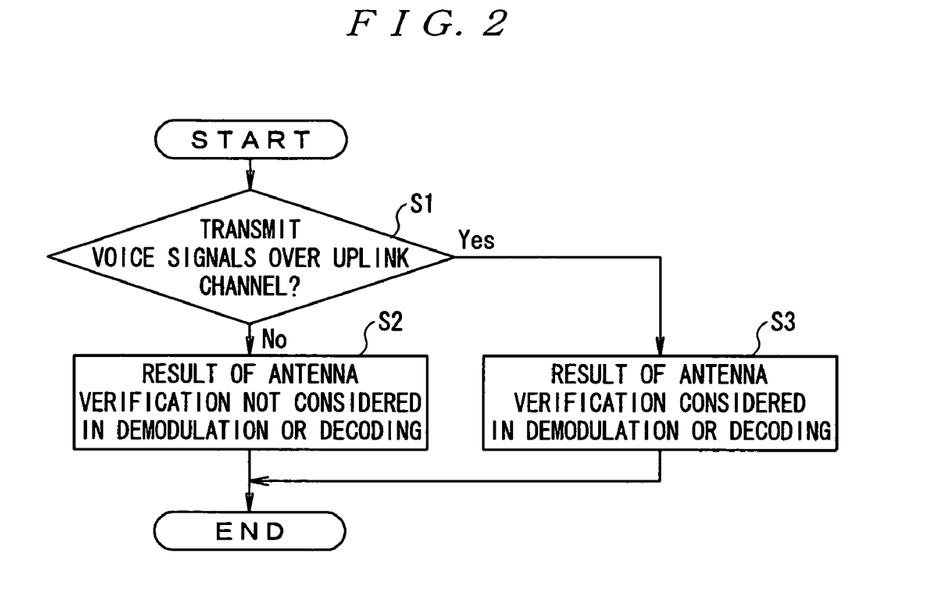
FIG. 2 is a flowchart of the communication control method depending on whether or not voice signals realized by the reception device shown in FIG. 1 is to be transmitted.

In FIG. 2, first in step S1, it is determined whether or not the channel of the uplink transmits voice signals, control is passed to step S3 when it is determined that an voice signals are to be transmitted, and control is passed to step S2 when it is determined that voice signals are not to be transmitted.

In step S2, demodulation and decoding are performed without considering a result of the antenna verification on the channel. That is, the demodulation and decoding are performed with the antenna verification process in the off state.

In step S3, the demodulation and decoding are performed on the channel with a result of the antenna verification taken into account. That is, the demodulation and decoding are performed with the antenna verification in the on state.

(Communication Control Method Depending on Transmission Rate)

Next, the communication control method of the mobile communication system according to the present invention is explained below by referring to the flowchart shown in FIG. 3.

Figure 3:
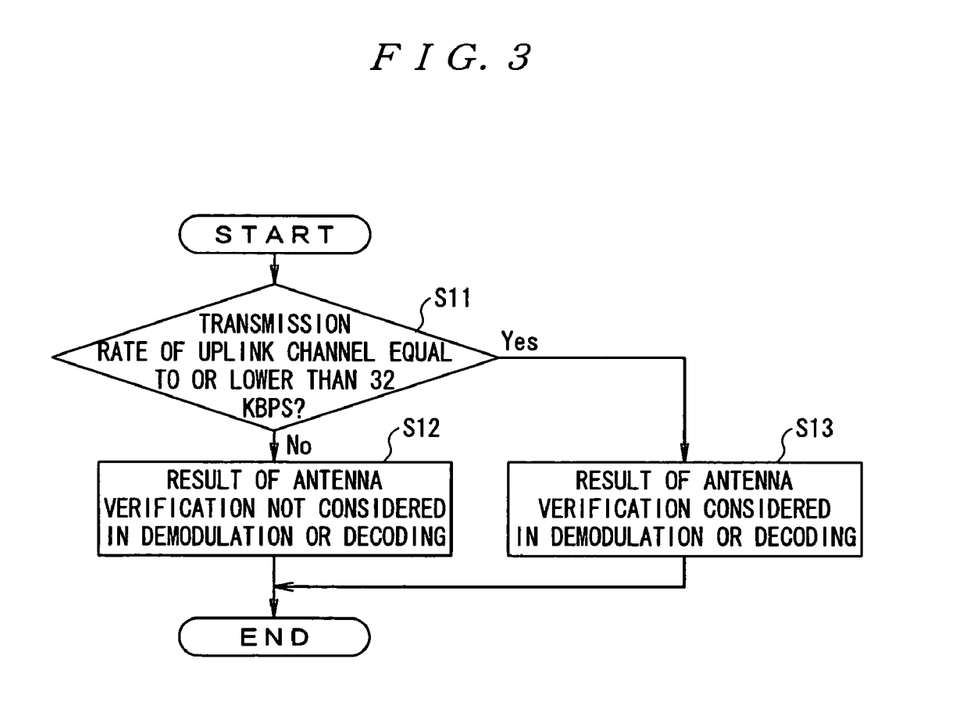
FIG. 3 is a flowchart of the communication control method depending on the transmission rate and realized in the reception device shown in FIG. 1.

In FIG. 3, it is determined in step S11 whether or not the transmission rate of the uplink is equal to or lower than 32 kbps. If it is determined that the transmission rate of the uplink is equal to or lower than 32 kbps, control is passed to step S13. If it is determined that the transmission rate of the uplink is higher than 32 kbps, control is passed to step S12.

In step S12, demodulation and decoding are performed without considering a result of the antenna verification on the channel. That is, the demodulation and decoding are performed with the antenna verification process in the off state.

In step S13, the demodulation and decoding are performed on the channel with a result of the antenna verification taken into account. That is, the demodulation and decoding are performed with the antenna verification in the on state.

In this example, the on-off of the antenna verification process is determined based on whether or not the uplink transmission rate is equal to or lower than 32 kbps, but it can be determined based on the transmission rate other than 32 kbps.

(Communication Control Method Depending on the Amplitude Ratio)

Figure 4:
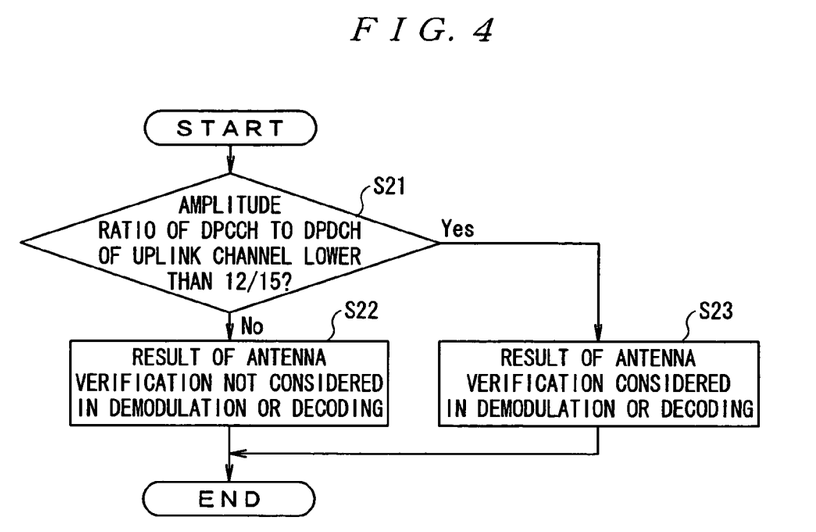
FIG. 4 is a flowchart of the communication control method depending on the amplitude ratio and realized in the reception device shown in FIG. 1.

Another communication control method for the mobile communication system according to the present invention is explained by referring to the flowchart shown in FIG. 4.

By referring to FIG. 4, in step S21, it is determined whether or not the amplitude ratio of the DPCCH (dedicated physical control channel) to the DPDCH (dedicated physical data channel) in the uplink is lower than 12/15. The DPDCH refers to a data channel in the physical layer, and the DPCCH refers to the control channel in the physical layer.

If it is determined as a result of the determination about the amplitude ratio that the amplitude ratio of the DPCCH to the DPDCH in the uplink is lower than 12/15, then control is passed to step S23, and if it is determined that the amplitude ratio of the DPCCH to the DPDCH in the uplink is equal to or higher than 12/15, then control is passed to step S22.

In step S22, demodulation and decoding are performed without considering a result of the antenna verification on the channel. That is, the demodulation and decoding are performed with the antenna verification process in the off state.

In step S23, the demodulation and decoding are performed on the channel with a result of the antenna verification taken into account. That is, the demodulation and decoding are performed with the antenna verification in the on state.

In this example, the on-off of the antenna verification process is determined depending on whether or not the amplitude ratio of the DPCCH to the DPDCH in the uplink is lower than 12/15, but it can be determined depending on the amplitude ratio other than 12/15.

(Communication Control Method Depending on Transmission Rate and Amplitude Ratio)

Next, the communication control method of the mobile communication system according to the present invention is explained below by referring to the flowchart shown in FIG. 5.

Figure 5:
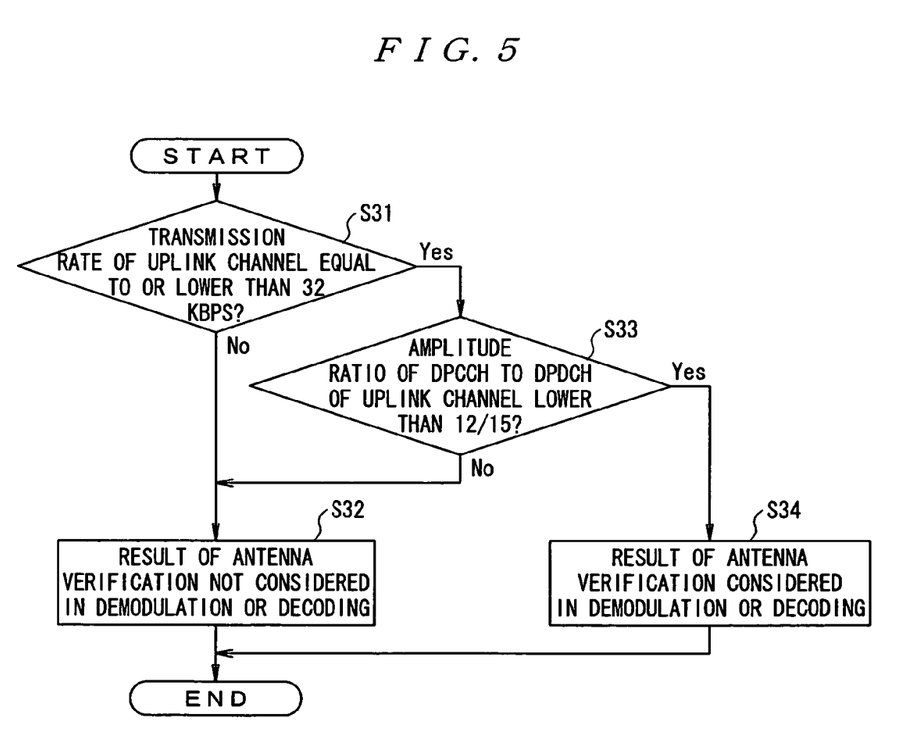
FIG. 5 is a flowchart of the communication control method depending on the transmission rate and the amplitude ratio and realized in the reception device shown in FIG. 1.

In FIG. 5, it is determined in step S31 whether or not the transmission rate of the uplink is equal to or lower than 32 kbps. If it is determined that the transmission rate of the uplink is equal to or lower than 32 kbps, control is passed to step S33. If it is determined that the transmission rate of the uplink is higher than 32 kbps, control is passed to step S32.

In step S33, it is determined whether or not the amplitude ratio of the DPCCH to the DPDCH in the uplink is lower than 12/15. If it is determined that the amplitude ratio of the DPCCH to the DPDCH is lower than 12/15, control is passed to step S34. If it is determined that the amplitude ratio of the DPCCH to the DPDCH is not lower than 12/15, control is passed to step S32.

In step S34, the demodulation and decoding are performed on the channel with a result of the antenna verification taken into account. That is, the demodulation and decoding are performed with the antenna verification in the on state.

In step S32, demodulation and decoding are performed without considering a result of the antenna verification on the channel. That is, the demodulation and decoding are performed with the antenna verification process in the off state.

In this example, the on-off of the antenna verification process is determined based on whether or not the uplink transmission rate is equal to or lower than 32 kbps, but it can be determined based on the transmission rate other than 32 kbps.

(Summary)

As described above, according to the mode for embodying the present invention, control can be performed with or without a result of the antenna verification taken into account depending on the channel type. That is, if a better characteristic can be expected for a channel with the result of the antenna verification taken into account, the result of the antenna verification is taken into account. However, if a better characteristic cannot be expected for a channel with the result of the antenna verification taken into account, the result of the antenna verification is not taken into account. Thus, the error rate for each channel can be reduced. When transmission power control is performed, the transmission power to be assigned to the channel can be reduced.

For example, as compared with a channel for transmission of voice, a channel for transmission of a packet is generally higher in transmission rate. Therefore, the channel for transmission of voice has a higher FBI bit error rate. It is assumed that the channel for transmission of a packet has a lower FBI bit error rate. Therefore, it can be controlled such that the antenna verification is performed on the channel for transmission of voice, and the antenna verification is not performed on the channel for transmission of a packet, thereby improving characteristics of both channels.

In the above-mentioned mode for embodying the present invention, the WCDMA (Wideband Code Division Multiple Access) system in the 3GPP is described, but the present invention is not limited to the WCDMA, and can also be applied to the communication system using the transmission diversity in other mobile communication systems, the MIMO (multiple input multiple output) system using feedback information, and the adaptive array antenna system.

(Example of Variation)

In the above-mentioned embodiments, the reception device and the receiving method for controlling on-off of the antenna verification based on the channel type in the uplink, transmission rate, etc. are explained. In this example of a variation, the reception device and receiving method of controlling the presumed probability of an FBI bit for use in antenna verification based on the channel type in the uplink, transmission rate, etc. are explained.

Figure 6:
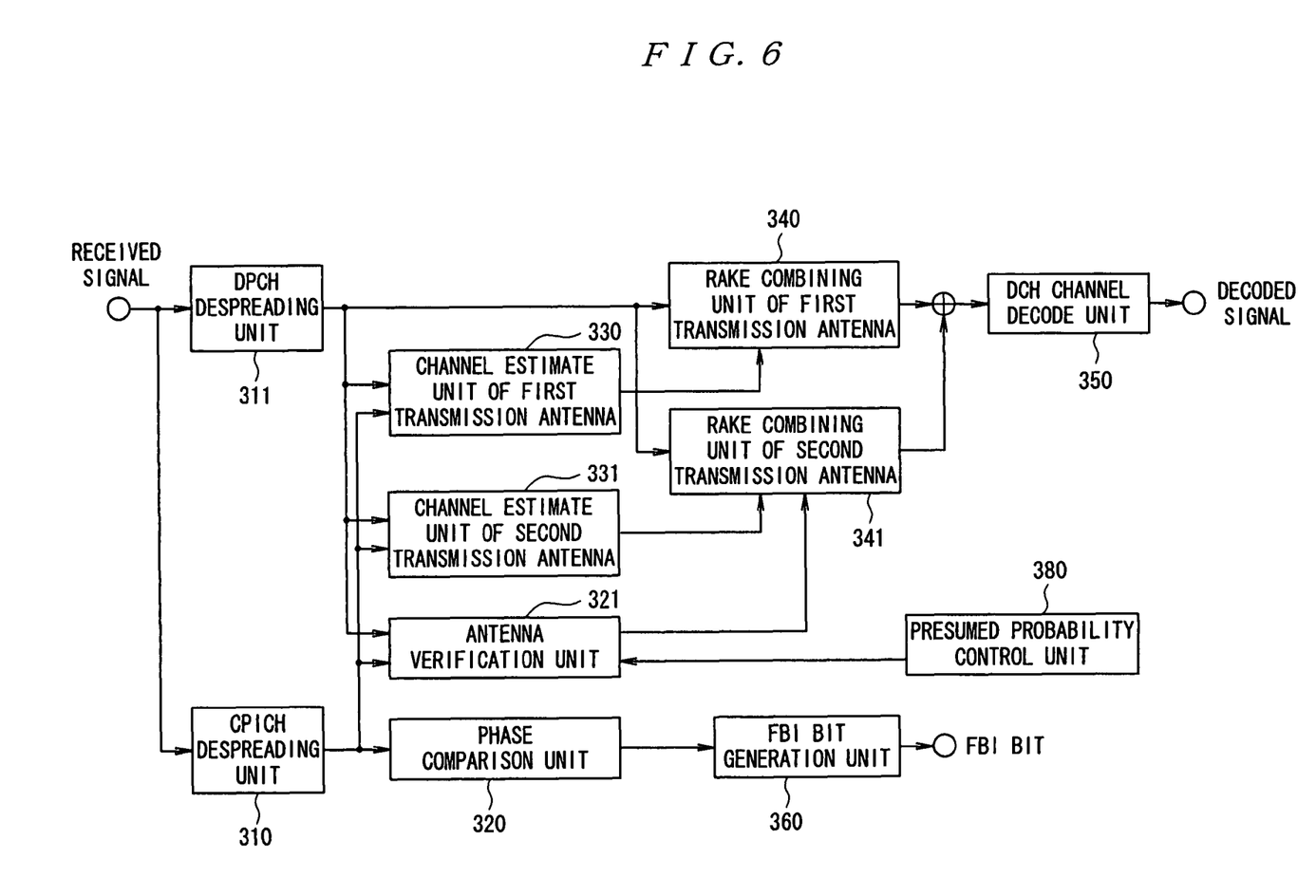
FIG. 6 is a block diagram showing an example of the configuration of the reception device according to a variation of the present invention.

FIG. 6 is an example of the configuration of the reception device to which the receiving method according to the present example of variation is applied. In the reception device shown in FIG. 6, the antenna verification on-off control unit 370 is deleted from the configuration shown in FIG. 1, and a presumed probability control unit 380 is added. The operation of the antenna verification unit 321 is different from the operation in the case shown in FIG. 1, but the same processes are performed on other portions as in the case shown in FIG. 1.

The antenna verification unit 321 performs antenna verification using the CPICH symbols received from the CPICH despreading unit 310, the dedicated pilot symbols received from the DPCH despreading unit 311, and the presumed probability received from the presumed probability control unit 380, estimates a weight coefficient by which the signals from the second transmission antenna are multiplied, and outputs the estimation result of the weight coefficient, that is, a result of the antenna verification to the RAKE combining unit 341 of the second antenna for the DPCH.

The presumed probability control unit 380 determines the presumed probability of an FBI bit based on the information about a channel in an uplink, for example, a channel type, or based on at least one of the transmission rate of a channel in the data link, the amplitude ratio of the control channel to the data channel, the TTI, the target error rate, and the slot format, and notifies the antenna verification unit 321 of the presumed probability.

It can be determined that the presumed probability is 90% if, for example, the channel in an uplink transmits voice signals, and the presumed probability is 96% if the channel type of the uplink refers to the transmission of packet signals.

It also can be determined that, for example, the presumed probability is 90% if the transmission rate of the channel in the uplink is equal to or lower than 32 kbps, the presumed probability is 96% if the transmission rate of the channel of the uplink is higher than 32 kbps and equal to or lower than 100 kbps, and the presumed probability is 99% if the transmission rate of the channel of the uplink is higher than 100 kbps.

It can also be determined that the presumed probability is 88%, for example, when the amplitude ratio of the DPCCH to the DPDCH in the uplink is lower than 12/15, and the presumed probability is 95% when the amplitude ratio of the DPCCH to the DPDCH in the uplink is equal to or higher than 12/15.

The determination of the presumed probability of an FBI bit can be performed based on both the transmission rate and the amplitude ratio of the DPCCH to the DPDCH in the uplink.

In the explanation above, the presumed probability control unit 380 determines the presumed probability of an FBI bit using the channel type in the uplink, transmission rate, etc. However, since a channel in an uplink is generally symmetrical about a channel in a downlink, the presumed probability can be controlled using the channel type in a downlink, the transmission rate, etc. in place of the channel type in an uplink.

(Other Communication Control Methods)

Next, the receiving method for use with the reception device according to the present invention is explained below by referring to the flowcharts shown in FIGS. 7 to 9.

(Communication Control Method Depending on Whether or not Voice Signals are Transmitted)

Figure 7:
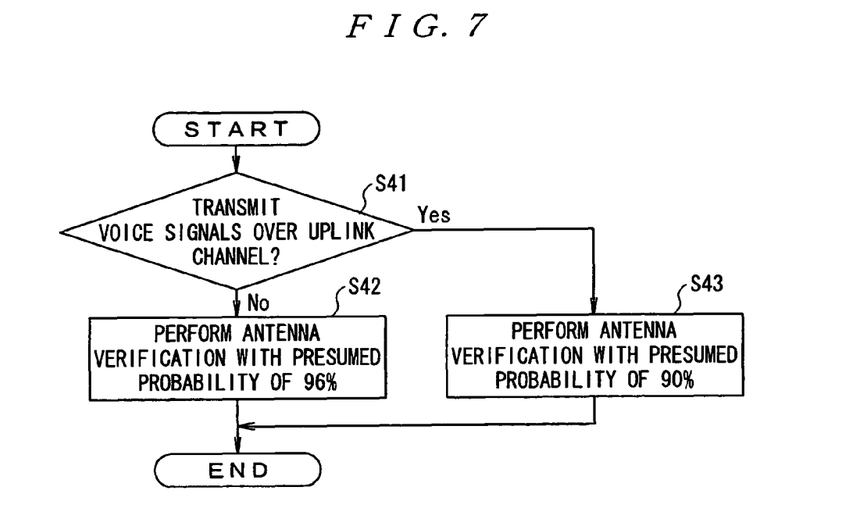
FIG. 7 is a flowchart of the communication control method depending on whether or not voice signals realized by the reception device shown in FIG. 6 is to be transmitted.

In FIG. 7, first in step S41, it is determined whether or not the channel of the uplink transmits voice signals, control is passed to step S43 when it is determined that voice signals are to be transmitted, and control is passed to step S42 when it is determined that voice signals are not to be transmitted.

In step S42, the antenna verification is performed with the presumed probability set to 96%, and the demodulation and decoding are performed with the result of the antenna verification taken into account.

In step S43, the antenna verification is performed with the presumed probability set to 90%, and the demodulation and decoding are performed with the result of the antenna verification taken into account.

(Communication Control Method Depending On Transmission Rate)

Next, the communication control method of the mobile communication system according to the present invention is explained below by referring to the flowchart shown in FIG. 8.

Figure 8:
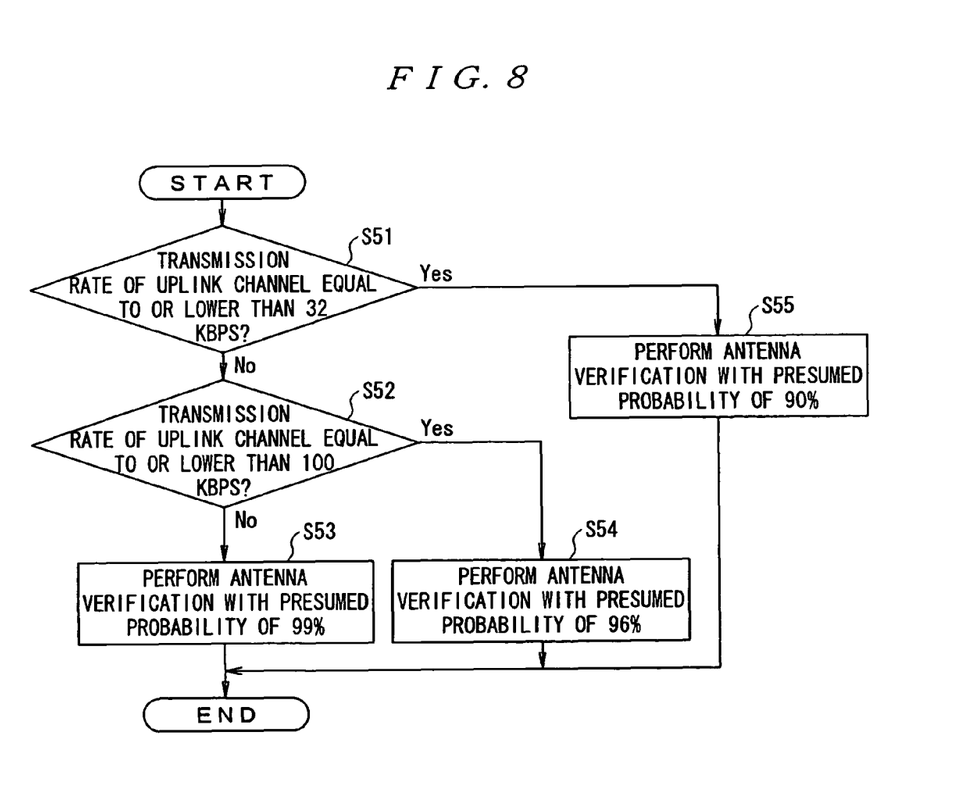
FIG. 8 is a flowchart of the communication control method depending on the transmission rate and realized in the reception device shown in FIG. 6.

In FIG. 8, it is determined in step S51 whether or not the transmission rate of the uplink is equal to or lower than 32 kbps. If it is determined that the transmission rate of the uplink is equal to or lower than 32 kbps, control is passed to step S55. If it is determined that the transmission rate of the uplink is not equal to or lower than 32 kbps, control is passed to step S52.

It is determined in step S52 whether or not the channel in the uplink is equal to or lower than 100 kbps. If it is determined that it is equal to or lower than 100 kbps, control is passed to step S54. If it is determined that it is not equal to or lower than 100 kbps, control is passed to step S53.

In step S53, the antenna verification is performed with the presumed probability set to 99%, and the demodulation and decoding are performed with the result of the antenna verification taken into account.

In step S54, the antenna verification is performed with the presumed probability set to 96%, and the demodulation and decoding are performed with the result of the antenna verification taken into account.

In step S55, the antenna verification is performed with the presumed probability set to 90%, and the demodulation and decoding are performed with the result of the antenna verification taken into account.

(Communication Control Method Depending on the Amplitude Ratio)

Figure 9:
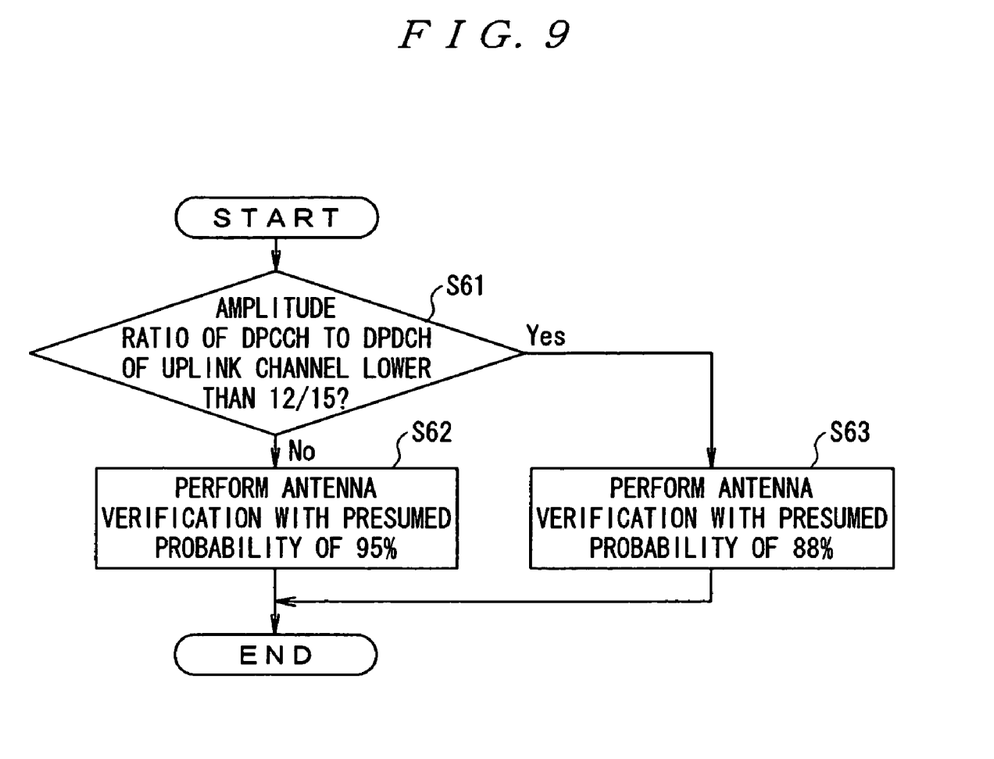
FIG. 9 is a flowchart of the communication control method depending on the amplitude ratio and realized in the reception device shown in FIG. 6.

Another communication control method for the mobile communication system according to the present invention is explained by referring to the flowchart shown in FIG. 9.

By referring to FIG. 9, in step S61, it is determined whether or not the amplitude ratio of the DPCCH to the DPDCH in the uplink is lower than 12/15. If it is determined that the amplitude ratio of the DPCCH to the DPDCH in the uplink is lower than 12/15, then control is passed to step S63, and if it is determined that the amplitude ratio of the DPCCH to the DPDCH in the uplink is equal to or higher than 12/15, then control is passed to step S62.

In step S62, the antenna verification is performed with the presumed probability set to 95%, and the demodulation and decoding are performed with the result of the antenna verification taken into account. In step S63, the antenna verification is performed with the presumed probability set to 88%, and the demodulation and decoding are performed with the result of the antenna verification taken into account.

The present invention can determine the presumed probability of an FBI bit for each channel in the uplink to improve the quality of the channel.

What is claimed is:

1. A reception device for use in a mobile communication system having a mobile station and a radio base station to which transmission diversity for transmitting transmission signals using a plurality of antennas is applied in a downlink to the mobile station, the reception device comprising:

an antenna verification unit that performs an antenna verification process of estimating a phase of the transmission signals from the plurality of antennas; and an antenna verification on-off control unit that receives a result of the antenna verification process and controls on-off of the antenna verification process according to information about a channel of signals transmitted in an uplink from the mobile station to the radio base station, wherein a closed loop transmission diversity control is performed by controlling the phase of the transmission signals from the plurality of antennas according to feedback information noticed by the mobile station to transmit the transmission signals.

2. The reception device according to claim 1, wherein the information about the channel of signals is a channel type, and the antenna verification on-off control unit performs control such that the antenna verification process is performed when the channel type is a channel for transmission of voice.

3. The reception device according to claim 1, wherein the information about the channel of signals is a transmission rate of a channel, an amplitude ratio of a control channel to a data channel, a transmission time interval, a target error rate, and a slot format based on at least one of which the antenna verification on-off control unit controls on-off of the antenna verification process.

4. The reception device according to claim 3, wherein the antenna verification on-off control unit performs control such that the antenna verification process can be performed when the transmission rate of the channel is equal to or less than a predetermined value.

5. The reception device according to claim 3, wherein the antenna verification on-off control unit performs control such that the antenna verification process can be performed when the amplitude ratio of the control channel to the data channel is less than a predetermined value.

6. A communication control method for use in a mobile communication system having a mobile station and a radio base station to which transmission diversity for transmitting transmission signals using a plurality of antennas is applied in a downlink to the mobile station, the communication control method comprising:

performing an antenna verification process of estimating a phase of the transmission signals from the plurality of antennas;

receiving a result of the antenna verification process; and controlling on-off of the antenna verification process according to information about a channel of signals transmitted in an uplink from the mobile station to the radio base station, wherein a closed loop transmission diversity control is performed by controlling the phase of the transmission signals from the plurality of antennas according to feedback information noticed by the mobile station to transmit the transmission signals.

* * * * *